United States Patent [19]

Baker et al.

[11] Patent Number: 5,675,751
[45] Date of Patent: Oct. 7, 1997

[54] COMPUTER SYSTEM HAVING A DSP LOCAL BUS

[75] Inventors: Robert Grover Baker, Delray Beach; Duy Quoc Huynh; Dennis Lee Moeller, both of Boca Raton; Paul Richard Swingle, Delray Beach; Loc Tien Tran; Suksoon Yong, both of Boca Raton, all of Fla.

[73] Assignee: International Business Machines Corporation, Armonk, N.Y.

[21] Appl. No.: 558,379

[22] Filed: Nov. 16, 1995

Related U.S. Application Data

[63] Continuation of Ser. No. 155,311, Nov. 19, 1993, abandoned.

[51] Int. Cl.$^6$ ........................................... G06F 13/14
[52] U.S. Cl. ........................................... 395/309; 395/293
[58] Field of Search ........................................... 395/293, 308, 395/309

[56] References Cited

U.S. PATENT DOCUMENTS

| | | |
|---|---|---|
| 4,837,682 | 6/1989 | Culler . |
| 4,870,704 | 9/1989 | Matelan et al. . |
| 4,935,868 | 6/1990 | DuLac . |
| 4,959,775 | 9/1990 | Yonekura ........................... 364/200 |
| 5,001,625 | 3/1991 | Thomas et al. . |
| 5,029,074 | 7/1991 | Maskas et al. . |
| 5,195,185 | 3/1993 | Marenin ........................... 395/325 |
| 5,237,686 | 8/1993 | Asano et al. ........................... 395/650 |
| 5,353,415 | 10/1994 | Wolford et al. ........................... 395/325 |
| 5,353,417 | 10/1994 | Fuoco et al. ........................... 395/325 |
| 5,353,423 | 10/1994 | Hamid et al. ........................... 395/425 |
| 5,377,331 | 12/1994 | Drerup et al. ........................... 395/325 |

FOREIGN PATENT DOCUMENTS

| | | |
|---|---|---|
| 0 397 180 A2 | 11/1990 | European Pat. Off. . |
| 0518504 | 12/1992 | European Pat. Off. . |
| 0564116 | 10/1993 | European Pat. Off. . |
| 0592213 | 4/1994 | European Pat. Off. . |
| WO91/15920 | 10/1991 | WIPO . |

OTHER PUBLICATIONS

82420/82430 PCIset ISA and EISA Bridges, Intel, Apr. 1993.

Feasible Processor Allocation in a Hard–Real–Time Environment, Richard K.J. Henn, The Journal of Real–Time Systems 1, 77–93 (1989), pp. 77–93.

A Model for a Hard Real Time System Executive, V. Gafni, IFAC Real Time Programming, Valencia, Spain 1988 pp. 69–74.

A feasibility test for scheduling tasks in a distributed hard real–time system, M. Chetto, APII–0296–1598/90/03, pp. 239–252.

Scheduling Processes with Release Times, Deadlines, Precedence, and Exclusion Relations, Jia Xu and David Lorge Parnas, IEEE Transactions on Software Engineering, vol. 16, No. 3, Mar. 1990, pp. 360–369.

DSP3210 Brings Music and Movement to PCs, A. Brown, Electron. World Wirel. World (UK), vol. 97, No. 1663, May 1991, p. 431.

(List continued on next page.)

*Primary Examiner*—Glenn A. Auve
*Attorney, Agent, or Firm*—Anthony N. Magistrale

[57] ABSTRACT

A computer system having a peripheral bus and a digital signal processor (DSP) local bus interfacing to the peripheral bus via an extended bus interface circuit (EBIC). The DSP local bus is configured such that devices, which are typically two or more DSPs, electrically connected to the DSP local bus may transfer data to other devices connected to the DSP local bus regardless of data transfer activity of the peripheral bus. Moreover, as seen from the peripheral bus, the devices connected to the DSP local bus have the same arbitration level. However, as seen from the DSP local bus, each device connected to the DSP local bus has a unique arbitration level determined by the priority of the tasks executing on the respective devices, as determined by a DSP operating system.

19 Claims, 3 Drawing Sheets

OTHER PUBLICATIONS

Interfacing Processor-Based Devices to Personal Computer Systems; IBM Technical Disclosure Bulletin, Baker, et al., vol. 32, No. 11, Apr. 1990, pp. 202–205.

Intelligent PC Adapter Card for SCSI Devices; IBM Technical Disclosure Bulletin, Lochner, Jan. 1990, vol. 32, No. 8A, pp. 95–97.

Dual Bus Processor Architecture; IBM Technical Disclosure Bulletin, Sep. 1989, Millas, vol. 32, No. 4A, pp. 161–165.

Multiple Digital Signal Processor Circuit Cards for Tool Control Applications; IBM Technical Disclosure Bulletin, Hammond, et al., Oct. 1989, vol. 32, No. 5A, pp. 452–454.

COMPUTER SYSTEM HAVING A DSP LOCAL BUS

This is a continuation of application Ser. No. 08/155,311 filed on Nov. 19, 1993, now abandoned.

FIELD OF THE INVENTION

The present invention relates generally to computer system architecture and, more specifically, to a computer system having a bus interface circuit that creates a digital signal processor (DSP) local bus from a peripheral bus that allows simultaneous data transfers between DSPs on the DSP local bus and between devices on the peripheral bus.

BACKGROUND OF THE INVENTION

Personal computer systems are well known in the art. Personal computer systems in general, and IBM Personal Computers in particular, have attained widespread use for providing computer power to many segments of today's modern society. Personal computers can typically be defined as a desktop, floor-standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage device, and an optional printer. One of the distinguishing characteristics of these systems is the use of a motherboard or system planar to electrically connect these components together. These systems are designed primarily to give independent computing power to a single user and are inexpensively priced for purchase by individuals or small business. Examples of such personal computer systems are IBM's PERSONAL COMPUTER AT and IBM's PERSONAL SYSTEM/2.

In computer systems, the components communicate via electrical signals. These electrical signals are typically carried by electrical connections between the system components. Typical types of electrical connections include metal traces on a printed circuit board, vias, plated through holes, plugs, and individual wires wrapped from pin to pin of system components. Typically groups of electrical signals and groups of electrical connections that carry the electrical signals are referred to as a "bus." Thus, a reference to a "bus" can indicate a reference to a group of electrical signals, a group of electrical connections that carry the electrical signals, or a reference to both a group of electrical signals that form a protocol and a group of electrical connections that carry the electrical signals. Systems can be said to have a variety of buses. A "local bus" is a bus that is, in general, synchronous with the CPU and designed to optimize the performance of the CPU. Most systems also have a "peripheral bus," which is either synchronous or asynchronous, and may transfer data at a slower frequency than the local bus. Peripheral buses typically have a number of interface slots, which are connectors that allow peripheral device cards to be pluggably connected to the peripheral bus. Typically the peripheral bus is interfaced to the system local bus with a bus interface circuit (BIC). The BIC interfaces between the system local bus and the peripheral bus, handling any differences in bus bandwidths, managing control of the buses between busmasters, etc.

Personal computer systems are typically used to execute software to perform such diverse activities as word processing, manipulation of data via spreadsheets, collection and relation of data in databases, displays of graphics, design of electrical or mechanical systems using system design software, etc.

One relatively recent use of the personal computer is that of the so-called "multimedia" system. In a multimedia system, the personal computer is used to capture, manipulate, or present information with audio, visual, and/or simple data content, or signals for computer networks, while executing other software on the computer. For example, in a very simple multimedia system, the user of the personal computer could listen to music from an audio compact disk (CD) while working on a document in a spreadsheet program executing on the same computer. In more complex examples, the personal computer is used to present a real-time audio/visual presentation, such as a marketing presentation for a company, or is used as a server, which requires it to generate a network signal without any intervention from the user, while another program is executing.

Multimedia systems require large amounts of data to be manipulated. The large amount of data can quickly overwhelm a CPU, rendering it incapable of simultaneously executing major programs and generating a complex multimedia presentation.

One common way of reducing the overhead to the CPU in multimedia systems is to add a coprocessor, such as a DSP, to the system. A DSP is typically a microprocessor with a reduced instruction set that is optimized to perform certain functions such as analog-to-digital conversion, digital-to-analog conversion, compression and decompression of digital data, performing mathematical operations, etc. Further, systems are typically designed so that the CPU will typically issue commands to the DSP, which will then execute the command independent of the CPU.

DSPs are sometimes capable of being a "busmaster." As such, DSPs are capable of suspending the operation of the CPU and assuming control of a bus, such as the system local bus. Control of the bus is done through arbitration. Each device on a bus that is capable of being a busmaster is assigned an arbitration level. On some buses, each busmaster is assigned a unique arbitration level; the CPU typically has the highest priority (and, therefore, is assigned the lowest arbitration level). On other buses, each busmaster will have the identical arbitration level, reflecting the fact that each has equal priority.

As multimedia systems have increased in complexity and more applications execute simultaneously, it often becomes necessary to add more than one DSP to each system. These DSPs frequently must transfer data between one another. Furthermore, the DSPs are typically either all attached to the system local bus or are attached to the peripheral bus. Only one device can use a bus at any given time. Therefore, when a DSP becomes busmaster and the DSP transfers data from another DSP or from a Micro Channel device, the system local bus or the peripheral bus and the system local bus are tied up, forcing the CPU to be idle during the transfer. Likewise, when the CPU is busmaster, the system local bus and the peripheral bus are tied up, forcing the DSPs to be idle during transfers.

It is therefore an advantage of the present invention to provide a multimedia computer system having multiple DSPs that does not tie up the system local bus or the peripheral bus during data transfers between DSPs.

It is a further advantage of this invention to be able to allow such communications between DSPs without totally redesigning the system local bus or the peripheral bus. That is, it is an advantage of the present invention to allow such transfers between DSPs in a system using a standard peripheral bus, such as IBM's Micro Channel Architecture (MCA).

SUMMARY OF THE INVENTION

According to the present invention, the computer system is designed with three buses: (1) a first local bus, which is the system local bus, (2) a peripheral bus, and (3) a second local bus, which is a DSP local bus. The first local bus and the peripheral bus communicate via a first bus interface unit. The main focus of this invention is on the addition of the DSP local bus as an extension of the peripheral bus. Thus, although systems will typically comprise these three buses, the first local bus is described primarily to contrast the DSP local bus. The DSP local bus is designed for optimal DSP performance and communicates with the peripheral bus via a second bus interface circuit, which is the extended bus interface circuit (EBIC).

The EBIC is designed to interface between standard peripheral buses, such as IBM's Micro Channel Architecture (MCA), and the DSP local bus without modification to the former. The EBIC, the DSP local bus, and the DSPs attached to the DSP local bus can be either placed on the system planar (system motherboard) or pluggably connected to the peripheral bus via expansion slots.

The arbitration level scheme of the present invention is unique. With respect to the DSP local bus, each DSP on the DSP local bus has a unique arbitration level. That is, each DSP has a unique priority value as seen from the DSP local bus. However, with respect to the peripheral bus, each DSP is assigned identical priority. More specifically, the arbitration level of the DSPs attached to the DSP local bus, as seen from the DSP local bus, is determined by a DSP operating system (DSPOS), which bases the priority level of each DSP on the "urgency" of the task being executed on that DSP. Nominally, each DSP on the DSP local bus will have an identical priority level as the other DSPs, as seen from the DSP local bus; however, the DSP executing the highest priority task will have the highest priority at any given time both (1) as seen from other DSP local bus devices and (2) once a device on the DSP local bus is given access to the peripheral bus.

It is therefore an advantage of the present invention to provide a computer system with a DSP local bus electrically connected to the peripheral bus.

It is a further advantage of this invention to provide a DSP local bus configured such that devices on the DSP local bus have unique priority levels when viewed from the DSP local bus and identical or varying priority levels when viewed from the peripheral bus.

These and other advantages of the present invention shall become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to exemplify the principles of this invention.

DETAILED DESCRIPTION OF THE PREFERRED EMBODIMENT

Figure 1:
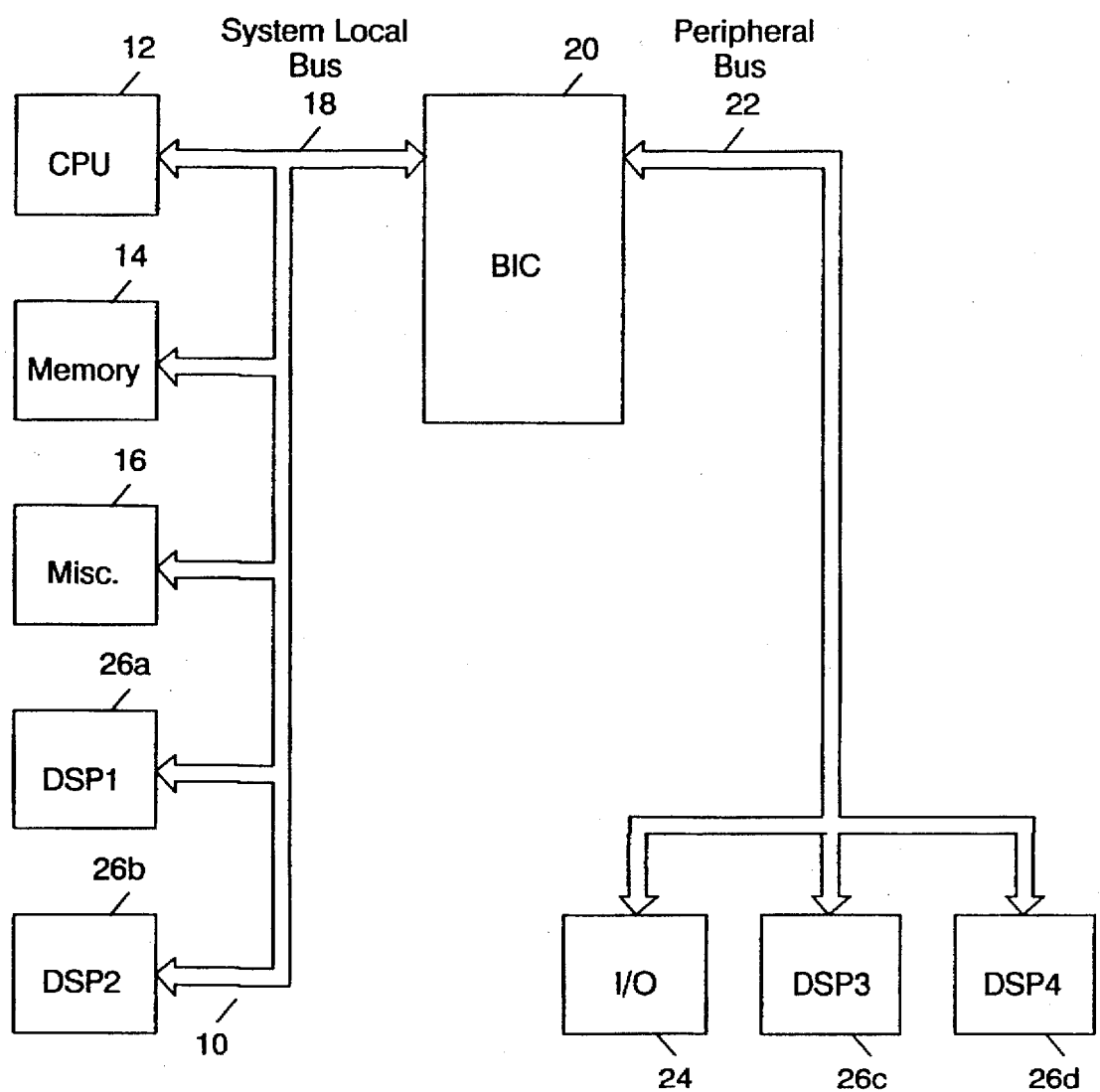
FIG. 1 is a block diagram of a generic prior art computer system with multiple DSPs.

Before describing the details of the present invention, a description of a generic prior art computer system 10 with multiple DSPs may be helpful in understanding the advantages of the computer system 40 of the present invention. Reference is made, therefore, to FIG. 1, which shows a prior art computer system 10 with multiple DSPs. The typical prior art computer system 10 comprises a CPU 12, memory 14, and miscellaneous circuitry 16 needed to generate the address, data, control, and status signals (not shown) that make up a system local bus 18. The prior art computer system 10 further comprises a bus interface circuit 20, which generates a peripheral bus 22. The peripheral bus 22 typically has a number of expansion slots (not shown) so that various I/O devices 24 may be pluggably connected to the peripheral bus 22.

The prior art computer system 10 also comprises a number of digital signal processors (DSPs) either attached to the system local bus 18, shown at 26a–26b, or attached to the peripheral bus 22, shown at 26c–26d. The computer system 10 may also have DSPs attached to both the system local bus 18 and the peripheral bus 22, shown at 26a–26d.

The BIC 20 acts as an interface between the system local bus 18 and the peripheral bus 22. For example, if the CPU 12 transfers data to the I/O devices 24, the BIC 20 must change the synchronous data along the system local bus 18 to asynchronous data along the peripheral bus 22. The BIC 20 may also be required to change bandwidth between the system local bus and the peripheral bus 22. For example, the system local bus 18 may have a bandwidth of 33 Mhz and the peripheral bus 22 may have a bandwidth of 16 Mhz.

The BIC 20 also arbitrates between busmasters that want control of the system local bus 18 or the peripheral bus 22. For example, a device, such as DSP3 26c, may want control over the peripheral bus 22. DSP3 will request control of the buses during an arbitration cycle. The BIC will determine when DSP3 26c can have control of the buses. Once DSP3 26c, becomes the busmaster, the CPU 12 relinquishes control of the system local bus 18, the DSP3 26c takes control of the peripheral bus 22 and, as will be shown below, the system local bus 18, and the DSP3 26a then performs the data transfers along the peripheral bus 22 and the system local bus 18 as though the DSP 26c is the CPU 12.

In typical designs the peripheral bus 22 "mirrors" the system local bus 18 when a device attached to the system local bus 18 is the busmaster. That is, the address and data lines (not shown) of the peripheral bus 22 assume the values of the corresponding address and data lines (not shown) of the system local bus 18. Likewise, the system local bus 18 mirrors the peripheral bus 22 when a device attached to the peripheral bus 22 is the busmaster.

Thus, when the system local bus 18 is in use, devices cannot use the peripheral bus 22. For example, if the CPU 12 is transferring data to DSP2 26b along the system local bus 18, the peripheral bus 22 mirrors that data and the peripheral bus 22 cannot be used to transfer data between, for example, DSP3 26c and DSP4 26d. Likewise, and critically, if DSP3 26c is transferring data to DSP4 26d along the peripheral bus 22, the CPU 12 must be idle, because the BIC 20 causes the system local bus 18 to mirror the activity on the peripheral bus 22.

In a system with multiple DSPs it may be necessary to have the DSPs 26a–26d transfer data directly to one another. No matter which DSPs transfer or receive the data, while the transfer is occurring, the CPU 12 must be idle, because, as stated above, the BIC 20 causes the system local bus 18 to mirror the activity on the peripheral bus 22. The more the DSPs 26a–26d transfer data between themselves, the more idle the CPU 12, the system local bus 18, and the peripheral bus 22 will be. System performance can be greatly diminished.

Thus, in the prior art computer system 10 with multiple DSPs 26a-26d, any transfer between the DSPs 26a-26d forces the CPU 12 to be idle, which greatly decreases system performance.

Moreover, even in systems where the system local bus 18 does not mirror the peripheral bus 22, DSP3 to DSP4 communications tie up the peripheral bus 22, preventing communication from or to any other device on the peripheral bus 22. The more the DSPs attached to the peripheral bus 22 transfer data between themselves, the more idle the peripheral bus 22 will be. Again, system performance can be greatly diminished.

Figure 2:
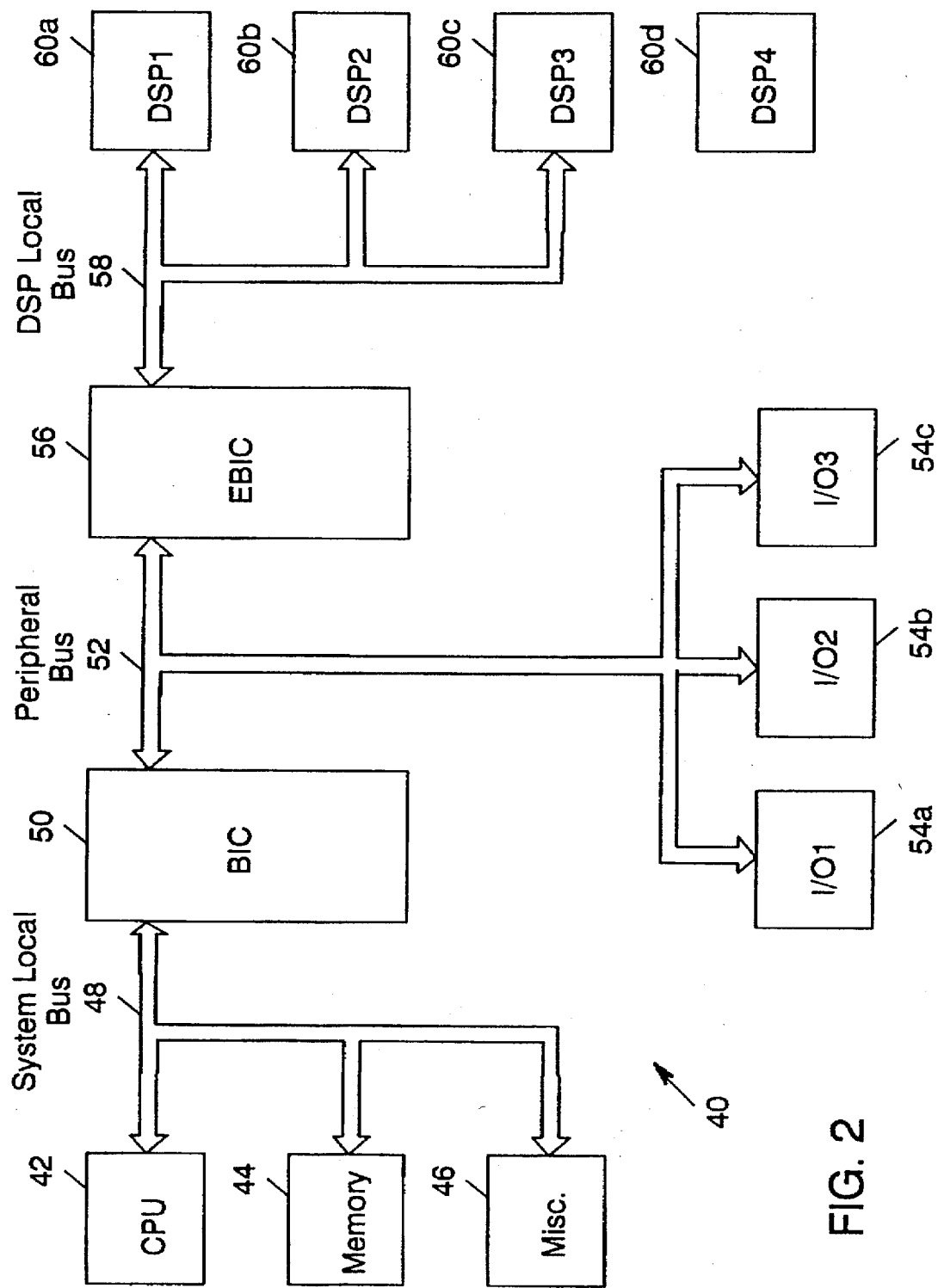
FIG. 2 is a block diagram of a computer system having a DSP local bus of the present invention.

FIG. 2 shows a computer system 40 of the present invention. The computer system 40 of the present invention, like the prior art computer system 10, comprises a CPU 42, memory 44, and miscellaneous circuitry 46 needed to generate the address, data, control, arbitration and status signals (not shown) that make up a system local bus 48. The computer system 40 of the present invention further comprises a bus interface circuit 50, which interfaces between the system local bus 48 and a peripheral bus 52. The peripheral bus 52 typically has a number of expansion slots (not shown) so that various I/O devices 54a-54c may be pluggably connected to the peripheral bus 52. The I/O devices are typically peripheral devices, such as SCSI cards, graphics cards, networking cards, TTL or relay input and output cards, logical analysis cards, oscilloscope cards, and other cards. Peripheral devices are characterized by being pluggably electrically connected to the peripheral bus 52. In addition, the same list may be system devices, which are characterized by their being electrically connected into the system local bus 48 or designed to be pluggably electrically connected to a system local bus connector (not shown).

The BIC 50 and the other devices attached to the peripheral bus 52 generate the address, data, control, arbitration and status signals (not shown) that make up the peripheral bus 52.

The computer system 40 of the present invention also comprises an extended bus interface circuit (EBIC) 56, which interfaces between the peripheral bus 52 and a DSP local bus 58. A number of DSPs 60a-60d are connected to the DSP local bus 58. In one embodiment, these DSPs 60a-60d are tightly coupled to each other; that is, they execute under a common DSPOS and may share the performing of tasks. The EBIC 56 and the other devices attached to the DSP local bus 58 generate the address, data, control, arbitration and status signals (not shown in FIG. 2) that make up the DSP local bus 58. The computer system 40 may also have DSPs (not shown) attached to both the system local bus 48 and the peripheral bus 52; however, such DSPs are probably loosely coupled to each other and the DSPs 60a-60d. The DSP local bus 58 is not necessarily, but can be, identical in structure to the system local bus 48. In one embodiment of practicing the invention, the system local bus 48 is designed to optimize performance of the CPU 42. Likewise, the DSP local bus 58 is designed to optimize the performance of the DSPs 60a-60d.

Like the BIC 20 of the computer system 10 of the prior art, the BIC 50 acts as an interface between the system local bus 48 and the peripheral bus 52. Like the BIC 20, the BIC 50 may be called to perform various interface tasks, such as converting synchronous data to asynchronous data, and vice versa, and converting data from one bandwidth to another. The exact nature of the BIC 50 will depend on the specific nature of the system local bus 48 and the peripheral bus 52.

Like the BIC 20 of the computer system 10 of the prior art, the BIC 50 also arbitrates between busmasters that want control of the system local bus 48 or the peripheral bus 52. However, adding the EBIC 56 and the DSP local bus 58 complicates the arbitration of the system 40. Arbitration will be covered more fully below.

Like the prior art system 10, the peripheral bus 52 of the system 40 of the present invention may mirror the system local bus 48 when a device attached to the system local bus 48 is the busmaster. Likewise, the system local bus 48 may mirror the peripheral bus 52 when a device attached to the peripheral bus 52 is the busmaster. Therefore, as in the prior art system 10, when the system local bus 48 is in use, devices may not be able to use the peripheral bus 52, and vice versa.

The key to the computer system 40 of the present invention is the addition of the EBIC 56 and the DSP local bus 58. In one embodiment, the details of the system local bus 48 are largely irrelevant. In one embodiment, the EBIC 56, the DSP local bus 58, and the DSPs 60a-60d are made into a card, which is pluggably connected to a peripheral bus—in this case, the Micro Channel. Thus, while the system local bus 48 is shown to illustrate the benefits of the computer system 40 of the present invention, it is not intended to be limiting.

In the computer system 40 of the present invention, data may be passed via any bus. For example, as in the prior art computer system 10, the CPU can transfer data to I/O1 54a via the system local bus 48, through the BIC 50, and via the peripheral bus 52. As another example, the CPU 42 can transfer data to DSP4 60d via the system local bus 48, through the BIC 50, via the peripheral bus 52, through the EBIC 56, and via the DSP local bus 58. The DSPs 60a-60d can likewise transfer data to the CPU 42 using the reverse path. A critical part of this data transfer scheme is the ability for the various devices to become "master" of a given bus or buses. As previously mentioned, the arbitration scheme will be further discussed below.

In the system 40 of the present invention, traffic can occur simultaneously on the peripheral bus 52 and the DSP local bus 58 in certain circumstances. Obviously, if a device on the system local bus 48 and a device on the DSP local bus 58 are communicating, then the system local bus 48, the peripheral bus 52, and the DSP local bus 58 will be tied up. However, if a device on the system local bus 48 is communicating with a device on the peripheral bus 52, only those two buses are tied up. Consequently, a device on the DSP local bus 58 is free to communicate with another device on the DSP local bus 58.

More specifically, the EBIC 56 is designed to allow simultaneous transfers between devices using the peripheral bus 52 and devices using the DSP local bus 58 under certain conditions. For example, while I/O1 54a is transferring data to I/O3 54c (via the peripheral bus 52) or the CPU (via the peripheral bus 52, through the BIC 50, and via the system local bus 48), DSP1 60a can transfer data to any of the other DSPs 60b-60d via the DSP local bus 58. Because tightly coupled DSPs may transfer massive amounts of data DSP-to-DSP in real time, this feature is believed to be critical to the effective functioning of the DSP local bus 58.

In most systems, many devices are capable of taking control of the buses; however, only one device can have control of a bus at any given time. Therefore, some device on the system must determine which of the many competing devices will have control of the bus at any given time. Such a device is typically called an "arbitration unit." Bus arbitration schemes typically limit the amount of time any device has control of the bus. For example, assuming the peripheral bus 58 is configured to meet the Micro Channel Architecture, the Micro Channel Architecture allows any one device to have control of the peripheral bus 58 for a maximum of 7.8 μs. Thus, the length of a single "arbitration cycle," which is the maximum amount of time a device may have control of a bus when other devices desire control, on a peripheral bus implementing the Micro Channel Architecture is 7.8 μs. Each arbitration cycle, the devices that want control over the bus will attempt to assert control of the bus.

The arbitration level of a device can be very important. If two devices desire control over the same bus, there are numerous ways of deciding which device will be given control. If the devices have unique arbitration levels, then the device with the highest priority, as reflected by the arbitration level, will be given control over the bus, unless the fairness feature dictates otherwise. The Micro Channel is an example of a bus that uses prioritized busmaster control. On the other hand, if the devices have identical arbitration levels, then the devices have equal priority and the matter is not quite as simple—some form of round-robin or other priority scheme must be used to achieve fair implementation of their equal priority.

In addition, some buses have a "fairness feature," which prevents a very high priority device from requesting and receiving control of the bus 100% of the time. The fairness feature essentially makes the high-priority device that is requesting control of the bus wait one or more arbitration cycles before receiving control of the bus again. For example, on the Micro Channel, a maximum of sixteen (16) devices can vie for control of the bus. The fairness feature ensures that each device, no matter how low its priority, is given control over the bus from time to time.

As described above, the computer system 40 of the present invention is designed to allow simultaneous transfers between devices attached to the peripheral bus 52 and between devices attached to the DSP local bus 58. It is believed that a special arbitration scheme will facilitate the above simultaneous transfers, while at the same time achieving compatibility with existing peripheral buses, such as the Micro Channel.

All devices attached to a typical peripheral bus 52 are considered one adapter. Therefore, from the point of view of normal operation of the peripheral bus 52, the EBIC 56 is one adapter. However, because the DSPs 60a–60d all communicate with devices on the peripheral bus 52 through the EBIC 56, the four DSPs 60a–60d appear to be only one adapter from the point of view of normal operation of the peripheral bus 52. If the EBIC 56 is given just one arbitration level, then all the DSPs 60a–60d will be assigned that same code, because the DSPs 60a–60d can only access the peripheral bus through the EBIC 56. This can cause a problem from an arbitration standpoint.

If devices attached to the peripheral bus 52 see all four DSPs 60a–60d as one adapter, the DSPs 60a–60d can be put into a situation whereby they are served one fourth as often as the other devices attached to the peripheral bus, such as various I/O devices 54a–54c. For example, assuming that I/O1 54a has higher priority than the EBIC 56 (and, consequently, the four DSPs 60a–60d) and supposing five devices—I/O1 54a, DSP1 60a, DSP2 60b, DSP3 60c, and DSP4 60d—want constant control over the peripheral bus 52. Without a fairness feature, I/O1 54a would have complete control of the peripheral bus 52. With a fairness feature, the EBIC 56 will be given control over the peripheral bus 52 every so often. Because each DSP 60a–60d is assigned the same priority level as the EBIC 56, only one DSP will be able to have control of the peripheral bus 52 each time the EBIC 56 is given control. Therefore, the devices might, for example, be given control of the peripheral bus 52 in the following order: I/O1, DSP1, I/O1, DSP2, I/O1, DSP3, I/O1, DSP4, I/O1, DSP1, etc. Thus, each DSP 60a–60d is served one-fourth as often as the EBIC 56 is served and one-fourth as often as I/O1 54a is served. Obviously, depending on the actual nature of the fairness feature, I/O1 54a may be given control over the peripheral bus 52 ten times for every time the EBIC 56 is given control. However, the nature of the problem caused by having all the DSPs 60a–60d be assigned the same arbitration priority level with respect to the peripheral bus 52 is clear: the DSPs are not given control of the peripheral bus 52 often enough.

The solution to this problem is to have a number of priority levels—one for every DSP attached to the DSP local bus 58—assigned to the EBIC 56. Suppose the same five devices desire control over the peripheral bus 52, and the DSPs all have unique priority levels with respect to the peripheral bus 52. Obviously, the EBIC 56 is the only actual adapter directly attached to the peripheral bus 52; however, because each DSP has its own priority level, each appears to be a virtual adapter on the peripheral bus 52, as far as arbitration is concerned. In this situation, the devices might, for example, be assigned control of the peripheral bus in the following order: I/O1, DSP1, DSP2, DSP3, DSP4, I/O1, DSP1, etc. Obviously, depending on the actual nature of the fairness feature, I/O1 54a may be given control over the peripheral bus 52 ten times for every time the EBIC 56 is given control. However, the advantage is clear—each DSP 60a–60d appears to be an adapter on the peripheral bus 52 and, therefore, each DSP 60a–60d is given a fair share of control of the peripheral bus 52.

Arbitration of the DSP local bus 58 need not be quite as complicated. The DSPs 60a–60d can all be assigned arbitration levels that are logically identical. Some form of round-robin or other fairness scheme would determine which DSP 60a–60d will have control of the DSP local bus 58 at any given time.

In one embodiment, however, the arbitration levels for each DSP attached to the DSP local bus 58 are controlled by a DSP operating system (DSPOS), which bases the priority level of each DSP on the task or tasks executing on that particular DSP. The DSPOS is a program executing on each DSP attached to the DSP local bus 58. Nominally, each DSP will have an identical priority level as the other DSPs, as seen from the DSP local bus; however, the DSP executing the highest priority task will have the highest arbitration priority at any given time.

A system 40 with a DSP local bus 58 is particularly well-suited to handle hard, real-time operating environments. In hard, real-time operating environments, guaranteed results of execution of any task must be made available by a fixed or "hard" deadline or else the application requiring the result of the task will fail and/or any other tasks awaiting execution may be adversely affected. To overcome this problem, scheduling algorithms are commonly used to perform task execution scheduling whenever a new task is invoked as an active task in a multi-tasking system. V. Gafni, *A Model for Hard Real Time System Executive*, pp. 69–74, IFAC Conference on Real Time Programming, Valencia, Spain, Copyright 1988; Henn, *Feasible Processor Allocation in a Hard Real-Time Environment*, The Journal of Real-Time Systems, Vol. 1, pp. 77–93, Copyright 1989, Kluwer Academic Publishers; Xu and Parnas, *Scheduling Processes with Release Times, Deadlines, Precedence, and Exclusion Relations*, IEEE Transactions on Software Engineering, Vol. 16, No. 3, March 1990, pp. 360–69; Chedow & Chedow, *A Feasibility Test for Scheduling Tasks* in a *Distributed Hard Real-Time System*, APII, Vol. 24, 1990, pp. 239–52, Copyright AFCET 1990. The above rescheduling algorithms reschedule the tasks according to their priority whenever a task arrival or start or invocation time occurs by placing the task to be executed in an execution queue or schedule with other tasks currently running or awaiting the opportunity to run. This approach amounts to conducting an order "N" sorting routine, where the worst case number of sorting iterations required depends upon the number of tasks currently in the execution queue.

Thus, in hard, real-time computer systems the DSPOS should schedule tasks by ordering the currently active tasks by the relative completion deadlines with the earliest completion deadline having highest priority. Although the above references disclose methods for determining the priority of tasks based on their respective "urgency," the complication of having tasks interrupted and the overhead involved with the resultant task switching generally costs great amounts of processing power and time. In particular, the solution offered by Gafni (*A Model for a Hard Real Time System Executive*), could easily end up using too much of the computer's resources rescheduling tasks because it requires keeping track of elapsed time, updating the remaining time for each task, and adding new tasks to the list which might cause the whole process to start over again. This might cause a hard real-time system to fail, particularly in a multi-media environment with many cyclical hard real-time tasks needing to be added to the list on an ongoing basis. Specifically, short execution period tasks create an inordinate amount of scheduling overhead.

In addition to the above references, another method of determining the priority of tasks is presented in the copending application entitled "Multi-Media Computer Operating System and Method," Ser. No. 07/829,201, filed Jan. 31, 1992. According to the invention of that application, the order of tasks in the queue is established by priority. Priority of tasks is in turn established at task completion times by the relative required execution deadlines. This prioritization, rather than a schedule prioritized merely at arrival time of the task on the basis of task starting time or ending times alone, is a key departure from the above references. Additionally, the order of the schedule of tasks to be executed is examined and rearranged in accordance with the relative priorities of the tasks whenever a task execution is completed or whenever a new task is added to or deleted from the queue of tasks currently active in the multi-tasking system. Overhead processing at task invocation is eliminated in the invention by placing all active recurrent tasks in an execution queue regardless of the task's current state of activity and by reprioritizing the order of execution of the tasks in the queue whenever a given task execution is completed.

Utilizing the invention in Copending application Ser. No. 07/829,201 above, the DSPOS would prioritize tasks by maintaining a list of all tasks, whether they are running or waiting to be started, in a list ordered by relative priority based on completion time. The order of the list is examined and adjusted when a task completes execution or whenever a brand new task is added to the system. This method results in a significant reduction in the scheduling overhead for systems with large numbers of hard real-time tasks. Because the scheduling is done at the completion of task execution, there cannot be simultaneous tasks needing scheduling. In addition, the scheduling of a task may be interrupted by the execution of a higher priority task being executed. The entries in the list cause a multitude of tasks with the same completion deadline to execute, thereby simplifying and streamlining the scheduling task.

A DSPOS prioritizing tasks as stated above would be very efficient; this kind of efficiency is critical in such application areas as multi-media and robotics.

Referring back to FIG. 2, the DSP local bus 58 is designed to optimize the DSPs' 60a–60d performance. For instance, the length of a standard arbitration cycle of the DSP local bus 58 will depend on the typical DSP-to-DSP transfer time. No single value is ideal, but the exact arbitration cycle time should take many factors into account. For example, in the one embodiment, the DSPs 60a–60d have a transfer buffer that is 16 words deep and will transfer data between each other via onboard direct memory access (DMA) controllers. Assuming that one word is transferred per cycle, assuming a DSP local bus speed of 16 Mhz, and assuming all 16 words are transferred in one cycle, the appropriate arbitration cycle time would be 1.0 μs plus any time needed to set up the transfers. Any more than that might waste valuable bus time and, therefore, lower the effective bandwidth of the DSP local bus 58.

The system local bus 48 implements a concept called "direct hand off." In a system supporting direct hand off, a busmaster that is finished using a bus before the end of the arbitration cycle time may pass control to another device. The direct hand off feature is closely linked to the arbitration in the local bus 48. Direct hand off on the system local bus 48 is controlled by the BIC 50, which has knowledge about those devices requesting control over the system local bus 48. Thus, when the current busmaster relinquishes control of the system local bus 48 through direct hand off, if the BIC 50 determines that the system local bus 48 still has time left in the current arbitration cycle, then the BIC 50 passes control of the system local bus to the device next in the arbitration queue.

In one embodiment, the DSP local bus 58 supports direct hand off. In that embodiment the DSP local bus supports direct hand off only to other devices attached to the DSP local bus 58. Control may not be passed to the peripheral bus 52 or the system local bus 48.

The system 40 must be designed to properly handle arbitration when a peripheral bus 52 busmaster attempts to transfer data to a device attached to the DSP local bus 58 when the DSP local bus 58 and the peripheral bus 52 are controlled by different busmasters. Several options are available. For example, if I/O3 54c is busmaster of the peripheral bus 52, if DSP1 60a is busmaster of the DSP local bus 58, and if I/O3 54c desires to transfer data to DSP4 60d, the EBIC 56 can do one of several things:

(1) The EBIC could remove control of the DSP local bus 58 from DSP1 60a at the end of the current transfer cycle and allow I/O3 54c to have virtually immediate control of the DSP local bus 58. In this instance, DSP1 60a would be given top priority for control of the DSP local bus 58 after I/O3 54c relinquishes control of the DSP local bus. While waiting for the current transfer cycle, the EBIC 56 will send a "not ready" signal to I/O3 54c. The actual implementation of the "not ready" signal will depend entirely on the exact nature of the peripheral bus 52.

(2) In the alternative, the EBIC 56 could wait until DSP1 60a relinquishes control of the DSP local bus 58 or until the end of the current arbitration cycle. While waiting for DSP1 60a to finish, the EBIC 56 would send I/O3 54c a signal telling I/O3 54c that the EBIC 56 is "not ready." As with alternative (1), the actual implementation of the "not ready" signal will depend entirely on the exact nature of the peripheral bus 52. This message would be repeated (either constantly or intermittently, depending on the exact nature of the peripheral bus 52) until DSP1 60a relinquishes control of the DSP local bus 58. Only then would the EBIC 56 grant control of the DSP local bus 58 to I/O3 54c.

To determine that a device attached to the peripheral bus 52, such as I/O3 54c in the immediately preceding paragraph, is attempting to transfer data to any of the devices on the DSP local bus 58, the EBIC 56 must monitor the destination address of the data being transferred by devices on the peripheral bus 52.

Figure 3:
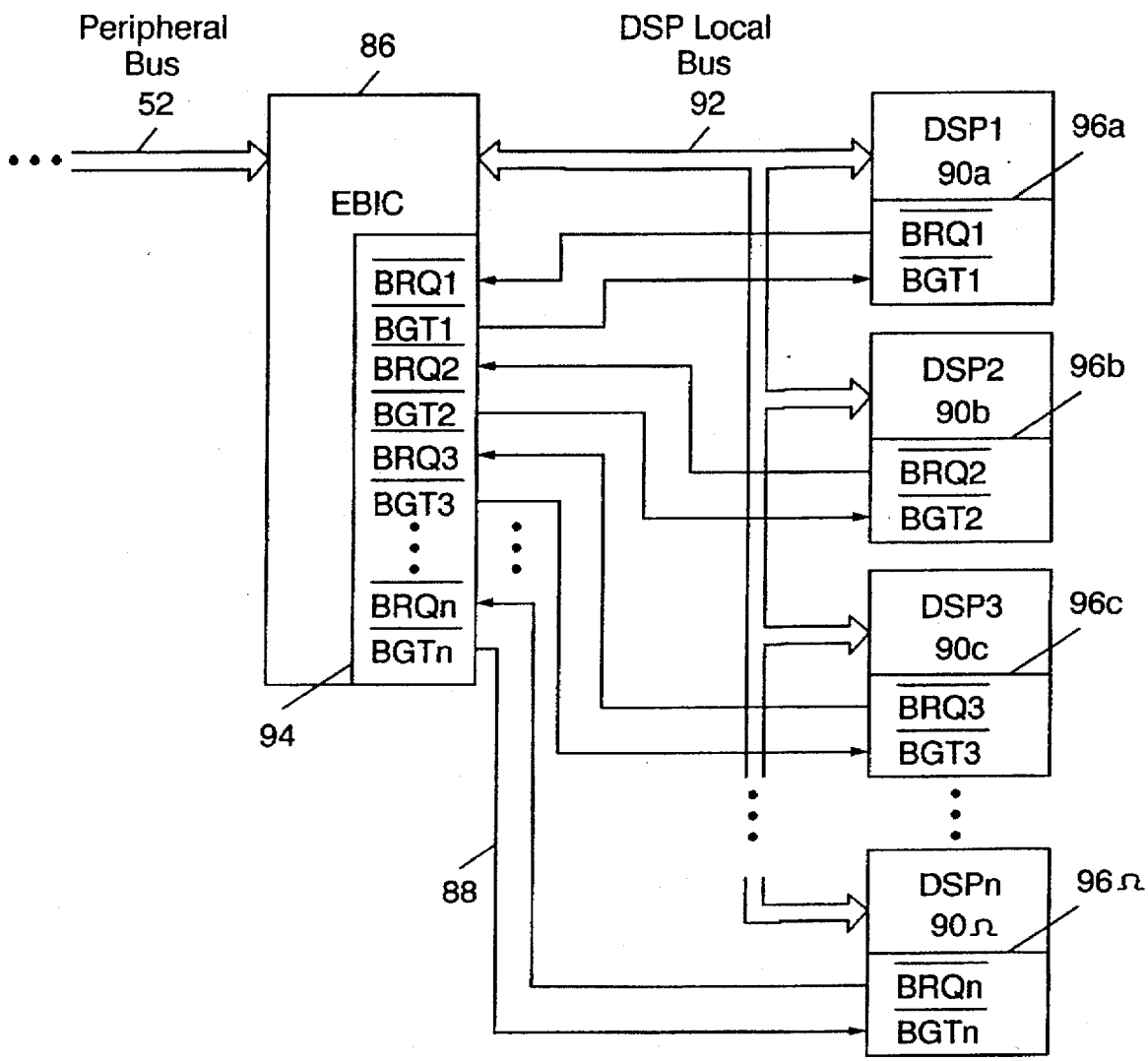
FIGS. 3 is a block diagram of an arbitration scheme for computer systems having a DSP local bus of the present invention.

Referring now to FIG. 3, some details of the prioritization scheme are shown. FIG. 3 is a schematic drawing showing an arbitration scheme based on an arbitration bus common to all DSPs. FIG. 3 shows an EBIC 86 interfacing between the peripheral bus 52 and a DSP local bus 88. A number of DSPs DSP1–DSPn 90a–90Ω (in this case n DSPs, where n is a positive integer greater than one) are attached to the DSP local bus 88. The arbitration scheme shown in FIG. 3 is centralized. The DSP local bus 88 is divided into n pairs of arbitration signals—n bus request signals $\overline{BRQ1}$–$\overline{BRQn}$ and n bus grant signals $\overline{BGT1}$–$\overline{BGTn}$—and the remaining address, data, status, and control signals, shown collectively at 92.

The EBIC 86 has a local bus arbitration control subcircuit (LBACS) 94, which is responsible for arbitrating control of the DSP local bus 88. Likewise, each DSP has an arbitration control subcircuit (ACS) 96a–96Ω. The LBACS 94 has an arbitration cycle counter (not shown), which counts a predetermined number of cycles (of a free-running clock signal, not shown) corresponding to the predetermined arbitration cycle time.

The $\overline{BRQ}$ and $\overline{BGT}$ signals are TTL (or MOS) signals. Each $\overline{BRQ}$ signal is generated by the corresponding ACS 96a–96Ω of each DSP and received by the LBACS 94. Each $\overline{BGT}$ signal is generated by the LBACS 94 of the EBIC 86 and received by the corresponding ACS 96a–96Ω of each DSP.

Using the arbitration scheme shown in FIG. 3 is straightforward. Only the device having control of the DSP local bus 88 may assert voltages onto the remaining DSP local bus lines 92. All devices without control of the DSP local bus 88 must put any drivers driving signals in the remaining DSP local bus lines 92 into a high-impedance state. Assuming that the EBIC 86 has initial control of the DSP local bus 88, the EBIC 86 will drive any signals in the remaining DSP local bus lines 92. $\overline{BRQ1}$–$\overline{BRQn}$ and $\overline{BGT1}$–$\overline{BGTn}$ all start in the logical ONE state.

The LBACS 94 of the EBIC 86 arbitrates control of the DSP local bus 88. Any DSP desiring control over the DSP local bus 88 requests control by placing its $\overline{BRQ}$ line to a logical ZERO, which is detected by the LBACS 94. If only one DSP desires control, then the LBACS 94 will grant that DSP control of the DSP local bus 88. For example, if DSP1 90a desires control, then its ACS 96a will change $\overline{BRQ1}$ from a logical ONE to a logical ZERO. If more than one device desires control, each DSP will request control by placing its $\overline{BRQ}$ line to a logical ZERO. For example, if both DSP1 90a and DSP3 90c want control, their ACSs 96a and 96c will change $\overline{BRQ1}$ and $\overline{BRQ3}$, respectively, from a logical ONE to a logical ZERO. Logic (not shown) within the LBACS 94 will decide control using a round-robin or other fairness scheme, or will decide control based on the current status of the DSPOS task priorities. The LBACS 96 will then place a single $\overline{BGT}$ line, corresponding to the DSP that is to be granted control, to the logical ZERO state. For example, if in both examples above, DSP1 90a is granted control of the bus, the LBACS will change $\overline{BGT1}$ from a logical ONE to a logical ZERO. Immediately after the LBACS 94 sets $\overline{BGT1}$ to a logical ZERO, the LBACS 94 initializes and starts the arbitration cycle counter. The ACS 96a of DSP1 90a will detect the change in $\overline{BGT1}$ and will assume control of the DSP local bus 88. DSP1 90a can relinquish control of the DSP local bus at any time by changing $\overline{BRQ1}$ from a logical ZERO to a logical ONE.

If, at any time, the LBACS 94 must take control of the DSP local bus 88 from the DSP in control, in this case DSP1 90a, the LBACS merely changes the $\overline{BGT}$ line, in this case $\overline{BGT1}$, from logical ZERO to logical ONE. The DSP will immediately relinquish control of the DSP local bus 88 and place all drivers driving the remaining DSP local bus lines 92 into the high impedance state. The LBACS 94 may change $\overline{BRQ1}$ to a logical ONE for a number of reasons. For example, the arbitration cycle counter may have counted the number of cycles indicating that the busmaster has used its full arbitration cycle time, and the EBIC 86 must allow another DSP to have control of the DSP local bus 88. In the alternative, possibly a device from the peripheral bus 52 desires control of the DSP local bus 88 and the EBIC 86 is designed to remove control from the busmaster immediately in that situation.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the EBIC can be implemented in a single chip or can be implemented in a number of different chips or different logic technologies. Therefore, the invention in its broader aspects is not limited to the specific details, representative apparatus and method, and illustrative examples shown and described. Accordingly, departures may be made from such details without departing from the spirit or scope of the applicant's general inventive concept.

We claim:

1. A computer system comprising:
   (a) a central processing unit having a first local bus associated therewith;
   (b) a peripheral bus;
   (c) a first bus interface controller directly connected to said first local bus, directly connected to said peripheral bus and comprising circuitry for arbitrating control over said first local bus and said peripheral bus; said first bus interface controller providing for (I) arbitration among said CPU and any other devices coupled directly to said first local bus for grant of access to said first local bus, (ii) arbitration among any devices coupled directly to said peripheral bus for grant of access to said peripheral bus, and (iii) arbitration among any devices coupled directly to said first local bus and any devices coupled directly to said peripheral bus for grant of access to said first local bus or said peripheral bus;
   (d) a digital signal processor (DSP) local bus;
   (e) at least a first DSP and a second DSP coupled directly to said DSP local bus; and
   (f) a second bus interface controller directly connected to said peripheral bus, directly connected to said DSP local bus and comprising circuitry for arbitrating control over said peripheral bus and said DSP local bus; and
   said second bus interface controller providing for (I) arbitration among said first and second DSPs coupled directly to said DSP local bus for grant of access to said DSP local bus, and (ii) arbitration among said first and second DSP coupled directly to said DSP local bus and any devices coupled directly to said peripheral bus for grant of access to said DSP local bus or said peripheral bus.

2. The computer system of claim 1 further comprising:
    (a) a peripheral device electrically connected to said peripheral bus;
    (b) wherein said first and second bus interface controllers comprise circuitry for allowing simultaneous data transfers:
        i. between said first digital signal processor and said second digital signal processor via said DSP local bus; and
        ii. between said central processing unit and said peripheral device via said first local bus, through said first bus interface controller, and via said peripheral bus.

3. The computer system of claim 1 further comprising:
    (a) at least a first peripheral device and a second peripheral device electrically connected to said peripheral bus;
    (b) wherein said first and second bus interface controllers comprise circuitry for allowing simultaneous data transfers:
        i. between said first digital signal processor and said second digital signal processor via said DSP local bus; and
        ii. between said first peripheral device and said second peripheral device via said peripheral bus.

4. The computer system of claim 1 further comprising:
    (a) a system device electrically connected to said first local bus;
    (b) wherein said first and second bus interface controllers comprise circuitry for allowing simultaneous data transfers:
        i. between said first digital signal processor and said second digital signal processor via said DSP local bus; and
        ii. between said central processing unit and said system device via said first local bus.

5. The computer system of claim 1 wherein said first and second digital signal processors have unique arbitration levels with respect to control over said peripheral bus.

6. The computer system of claim 1 wherein said first and second digital signal processors have unique arbitration levels with respect to control over said first local bus.

7. The computer system of claim 1 wherein said first and second digital signal processors have unique arbitration levels with respect to control over said first local bus and said peripheral bus.

8. The computer system of claim 1 further comprising:
    (a) wherein each of said digital signal processors is operative to execute a task or tasks; and
    (b) wherein said first and second digital signal processors have unique arbitration levels, with respect to control over said DSP local bus, said unique arbitration levels being controlled by a DSP operating system executing on each of said DSPs, said DSP operating system basing the unique arbitration level of each DSP on the priority of the respective task or tasks executing on each of said first and second digital signal processors; and
    (c) wherein said first and second digital signal processors have unique arbitration levels with respect to control over said peripheral bus.

9. The computer system of claim 8, wherein said DSP operating system prioritizes said task or tasks by maintaining a list of all tasks, whether they are executing or waiting to be executed, in a list ordered by relative priority based on completion time, said order of said tasks in said list being adjusted by said DSP operating system when a task completes execution or whenever a brand new task is added to the system.

10. The computer system of claim 1 further comprising:
    (a) wherein each of said digital signal processors is operative to execute a task or tasks; and
    (b) wherein said first and second digital signal processors have unique arbitration levels, with respect to control over said DSP local bus, said unique arbitration levels being controlled by a DSP operating system executing on each of said DSPs, said DSP operating system basing the unique arbitration level of each DSP on the priority of the respective task executing on each of said first and second digital signal processors; and
    (c) wherein said first and second digital signal processors have unique arbitration levels with respect to control over said first local bus.

11. The computer system of claim 10, wherein said DSP operating system prioritizes said task or tasks by maintaining a list of all tasks, whether they are executing or waiting to be executed, in a list ordered by relative priority based on completion time, said order of said tasks in said list being adjusted by said DSP operating system when a task completes execution or whenever a brand new task is added to the system.

12. The computer system of claim 1 further comprising:
    (a) wherein each of said digital signal processors is operative to execute a task or tasks; and
    (b) wherein said first and second digital signal processors have unique arbitration levels, with respect to control over said DSP local bus, said unique arbitration levels being controlled by a DSP operating system executing on each of said DSPs, said DSP operating system basing the unique arbitration level of each DSP on the priority of the respective task executing on each of said first and second digital signal processors; and
    (c) wherein said first and second digital signal processors have unique arbitration levels with respect to control over said first local bus and said peripheral bus.

13. The computer system of claim 12, wherein said DSP operating system prioritizes said task or tasks by maintaining a list of all tasks, whether they are executing or waiting to be executed, in a list ordered by relative priority based on completion time, said order of said tasks in said list being adjusted by said DSP operating system when a task completes execution or whenever a brand new task is added to the system.

14. The computer system of claim 1 further comprising:
    (a) wherein said first digital signal processor has an identical arbitration level to said second digital signal processor with respect to control over said DSP local bus; and
    (b) wherein said first and second digital signal processors have unique arbitration levels with respect to control over said peripheral bus.

15. The computer system of claim 1 further comprising:
    (a) wherein said first digital signal processor has an identical arbitration level to said second digital signal processor with respect to control over said DSP local bus; and
    (b) wherein said first and second digital signal processors have unique arbitration levels with respect to control over said first local bus.

16. The computer system of claim 1 further comprising:
(a) wherein said first digital signal processor has an identical arbitration level to said second digital signal processor with respect to control over said DSP local bus; and
(b) wherein said first and second digital signal processors have unique arbitration levels with respect to control over said first local bus and said peripheral bus.

17. The computer system of claim 1 further comprising:
(a) a peripheral device electrically connected to said peripheral bus; and
(b) wherein said first and second bus interface controllers comprise circuitry for allowing simultaneous data transfers:
  i. between said first digital signal processor and said second digital signal processor via said DSP local bus; and
  ii. between said central processing unit and said peripheral device via said first local bus, through said first bus interface controller, and via said peripheral bus;
(c) wherein said first digital signal processor has an identical arbitration level to said second digital signal processor with respect to control over said DSP local bus; and
(d) wherein said first and second digital signal processors have unique arbitration levels with respect to control over said first local bus and said peripheral bus.

18. The computer system of claim 1, wherein said first and second bus interface controllers comprise circuitry for allowing simultaneous data transfers:
  (i) between said first and second DSPs coupled to said DSP local bus via said DSP local bus, and either
  (ii) between a first and a second peripheral bus master coupled to said peripheral bus via said peripheral bus, or
  (iii) between said CPU and a first local bus master coupled to said first local bus via said first local bus, or
  (iv) between said CPU and a peripheral bus master coupled to said peripheral bus via said first local bus, through said first bus interface controller, and via said peripheral bus.

19. The computer system of claim 1 wherein said peripheral bus is a Micro Channel bus.

* * * * *